(12) United States Patent
Wakazono et al.

(10) Patent No.: US 12,286,900 B2
(45) Date of Patent: Apr. 29, 2025

(54) ROTOR BLADE AND GAS TURBINE PROVIDED THEREWITH

(71) Applicant: MITSUBISHI HEAVY INDUSTRIES, LTD., Tokyo (JP)

(72) Inventors: Susumu Wakazono, Tokyo (JP); Satoshi Hada, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/717,249

(22) PCT Filed: Sep. 26, 2022

(86) PCT No.: PCT/JP2022/035645
§ 371 (c)(1),
(2) Date: Jun. 6, 2024

(87) PCT Pub. No.: WO2023/127211
PCT Pub. Date: Jul. 6, 2023

(65) Prior Publication Data
US 2025/0034999 A1    Jan. 30, 2025

(30) Foreign Application Priority Data

Dec. 28, 2021 (JP) ................................. 2021-214019

(51) Int. Cl.
*F01D 5/18* (2006.01)
(52) U.S. Cl.
CPC .............. *F01D 5/18* (2013.01); *F01D 5/186* (2013.01); *F01D 5/187* (2013.01); *F05D 2260/20* (2013.01); *F05D 2260/941* (2013.01)
(58) Field of Classification Search
CPC . F01D 5/18; F01D 5/186; F01D 5/187; F05D 2260/20; F05D 2260/941
See application file for complete search history.

(56) References Cited

U.S. PATENT DOCUMENTS

| | | | |
|---|---|---|---|
| 3,420,502 A | * | 1/1969 | Howald .................. F01D 5/187 415/115 |
| 5,813,835 A | | 9/1998 | Corsmeier et al. |

(Continued)

FOREIGN PATENT DOCUMENTS

| | | |
|---|---|---|
| JP | 05-195704 | 8/1993 |
| JP | 9-133001 | 5/1997 |

(Continued)

OTHER PUBLICATIONS

International Search Report issued Nov. 1, 2022 in International Application No. PCT/JP2022/035645, with English translation.

(Continued)

*Primary Examiner* — Elton K Wong
*Assistant Examiner* — Theodore C Ribadeneyra
(74) *Attorney, Agent, or Firm* — Wenderoth, Lind & Ponack, L.L.P.

(57) ABSTRACT

A rotor blade including: a blade body extending in a blade height direction that is a direction perpendicular to an airfoil cross-section; and a platform provided to an end at a hub side, from between a tip side and the hub side which are of the blade height direction. The blade body includes: an anterior edge and a posterior edge; a ventral surface and a dorsal surface linking the anterior edge and the posterior edge together; and a cooling passage extending in the blade height direction between the ventral surface and the dorsal surface. The ventral/dorsal wall thickness ratio at any position between the hub-side position and the middle position in the cooling passage is smaller than the ventral/dorsal wall thickness ratio at any position between the middle position and the tip-side position.

13 Claims, 9 Drawing Sheets

(56) References Cited

U.S. PATENT DOCUMENTS

| | | | |
|---|---|---|---|
| 6,126,396 | A | 10/2000 | Doughty et al. |
| 6,325,593 | B1 | 12/2001 | Darkins, Jr. et al. |
| 6,390,774 | B1 | 5/2002 | Lewis et al. |
| 11,162,432 | B2 * | 11/2021 | Packer .................... F01D 9/041 |
| 2005/0111977 | A1 | 5/2005 | Lee et al. |
| 2007/0048144 | A1 * | 3/2007 | Morrison .................. F01D 5/18 |
| | | | 416/224 |
| 2011/0243711 | A1 | 10/2011 | Vehr |
| 2012/0020805 | A1 * | 1/2012 | Suciu ........................ F01D 5/30 |
| | | | 29/889.7 |
| 2016/0222790 | A1 * | 8/2016 | Spangler ................. F01D 5/147 |
| 2019/0338649 | A1 | 11/2019 | Jennings et al. |
| 2021/0207493 | A1 | 7/2021 | Fishback et al. |

FOREIGN PATENT DOCUMENTS

| | | |
|---|---|---|
| JP | 2000-213304 | 8/2000 |
| JP | 2001-214703 | 8/2001 |
| JP | 2001-227302 | 8/2001 |
| JP | 2005-155606 | 6/2005 |
| JP | 2011-214575 | 10/2011 |
| JP | 2021-071085 | 5/2021 |

OTHER PUBLICATIONS

Written Opinion of the International Searching Authority issued Nov. 1, 2022 in International Application No. PCT/JP2022/035645, with English translation.

* cited by examiner

ROTOR BLADE AND GAS TURBINE PROVIDED THEREWITH

TECHNICAL FIELD

The present disclosure relates to a rotor blade and a gas turbine including the same.

This application claims priority to Japanese Patent Application No. 2021-214019, filed in Japan on Dec. 28, 2021, the content of which is incorporated herein by reference.

BACKGROUND ART

Gas turbines include a compressor that compresses air, a combustor that combusts fuel in the air compressed by the compressor to generate combustion gas, and a turbine that is driven by the combustion gas from the combustor. The turbine includes a rotor that rotates around an axis and a turbine casing that covers the rotor. The rotor Includes a rotor shaft and plurality of rotor blades attached to the rotor shaft.

The rotor blade of the gas turbine is exposed to a high-temperature combustion gas. Therefore, the rotor blade is generally cooled by air or the like.

For example, in a rotor blade described in PTL 1 below, a plurality of cooling passages extending in a vane height direction are formed inside surface of the rotor blade. In the drawings of PTL 1, a wall thickness, which is a distance between an inner peripheral surface and the vane surface for each of the plurality of cooling passages, is drawn to gradually increase from a tip side of a rotor blade body toward a hub side.

CITATION LIST

Patent Literature (PTL 1) Japanese Unexamined Patent Application Publication No. 2000-213304

SUMMARY OF INVENTION

Technical Problem

Durability is required for the rotor blade of the gas turbine.

Thus, an object of the present disclosure is to provide a rotor blade and a gas turbine including the rotor blade capable of improving durability.

Solution to Problem

A rotor blade as one aspect for achieving the above object includes a rotor blade body having an airfoil-shaped cross section and extending in vane height direction having a directional component perpendicular to the cross section, and a platform provided a among a tip side and a hub side opposite to the tip side in the vane height direction, an end of the rotor blade body on the hub side, in which the rotor blade body has an anterior edge and a posterior edge extending in the vane height direction and facing sides that are opposite to each other, a ventral surface and a dorsal surface extending in the vane height direction, connecting the anterior edge and the posterior edge to each other, and facing sides that are opposite to each other, and one or more cooling passages positioned between the ventral surface and the dorsal surface and extending in the vane height direction, a distance between an inner peripheral surface in the one or more cooling passages and the dorsal surface is a dorsal wall thickness, a distance between the inner peripheral surface in the one or more cooling passages and the ventral surface is a ventral wall thickness, a ratio of the ventral wall thickness to the dorsal wall thickness is a ventral/dorsal wall thickness ratio, a position of 5% to 15% of a vane height, which is a side, is a hub-side position, a position of 25% to 35% of the vane height from the platform is a middle position, a position of 90% to 100% of the vane height from the platform is a tip-side position, and the ventral/dorsal wall thickness ratio at any position in a hub-side region between the hub-side position and the middle position in the vane height direction smaller than the ventral/dorsal wall thickness ratio at any position in a tip-side region between the middle position and the tip-side position in the vane height direction, in any one cooling passage of the one or more cooling passages.

In addition, a rotor blade as one aspect includes a rotor blade body having an airfoil-shaped cross section and extending in a vane height direction having directional component perpendicular to the cross section, and a platform provided at, among a tip side and a hub side opposite to the tip side in the vane height direction, an end of the rotor blade body on the hub side, in which the rotor blade body has an anterior edge and a posterior edge extending in the vane height direction and facing sides that are opposite to each other, a ventral surface and a dorsal surface extending in the vane height direction, connecting the anterior edge and the posterior edge to each other, and facing sides that are opposite to each other, and one or more cooling passages positioned between the ventral surface and the dorsal surface and extending in the vane height direction, a distance between an inner peripheral surface in the one or more cooling passages and the dorsal surface is a dorsal wall thickness, a distance between the inner peripheral surface the one or more cooling passages and the ventral surface is a ventral wall thickness, a position of 58 to 15% of a vane height, which is a distance from the platform to an end of the rotor blade body on the tip side, is a hub-side position, a position of 25% to 35% of the vane height from the platform is a middle position, a position of 90% to 100% of the vane height from the platform is a tip-side position, and the ventral wall thickness at any position in a hub-side region between the hub-side position and the middle position in the vane height direction is smaller than the ventral wall thickness at any position in a tip-side region between the middle position and the tip-side position in the vane height direction, in any one cooling passage of the one or more cooling passages.

In addition, a gas turbine as one aspect includes a plurality of the above-described rotor blades, a rotor shaft that is rotatable around an axis and that is provided with the plurality of rotor blades on an outer periphery, and a gas turbine casing that covers the plurality of rotor blades and the rotor shaft.

Advantageous Effects of Invention

According to an aspect of the present invention, it is possible to improve durability of a rotor blade.

DESCRIPTION OF EMBODIMENTS

Hereinafter, the embodiment according to the present disclosure will be described in detail with reference to the drawings.

Embodiment of Gas Turbine

Figure 1:
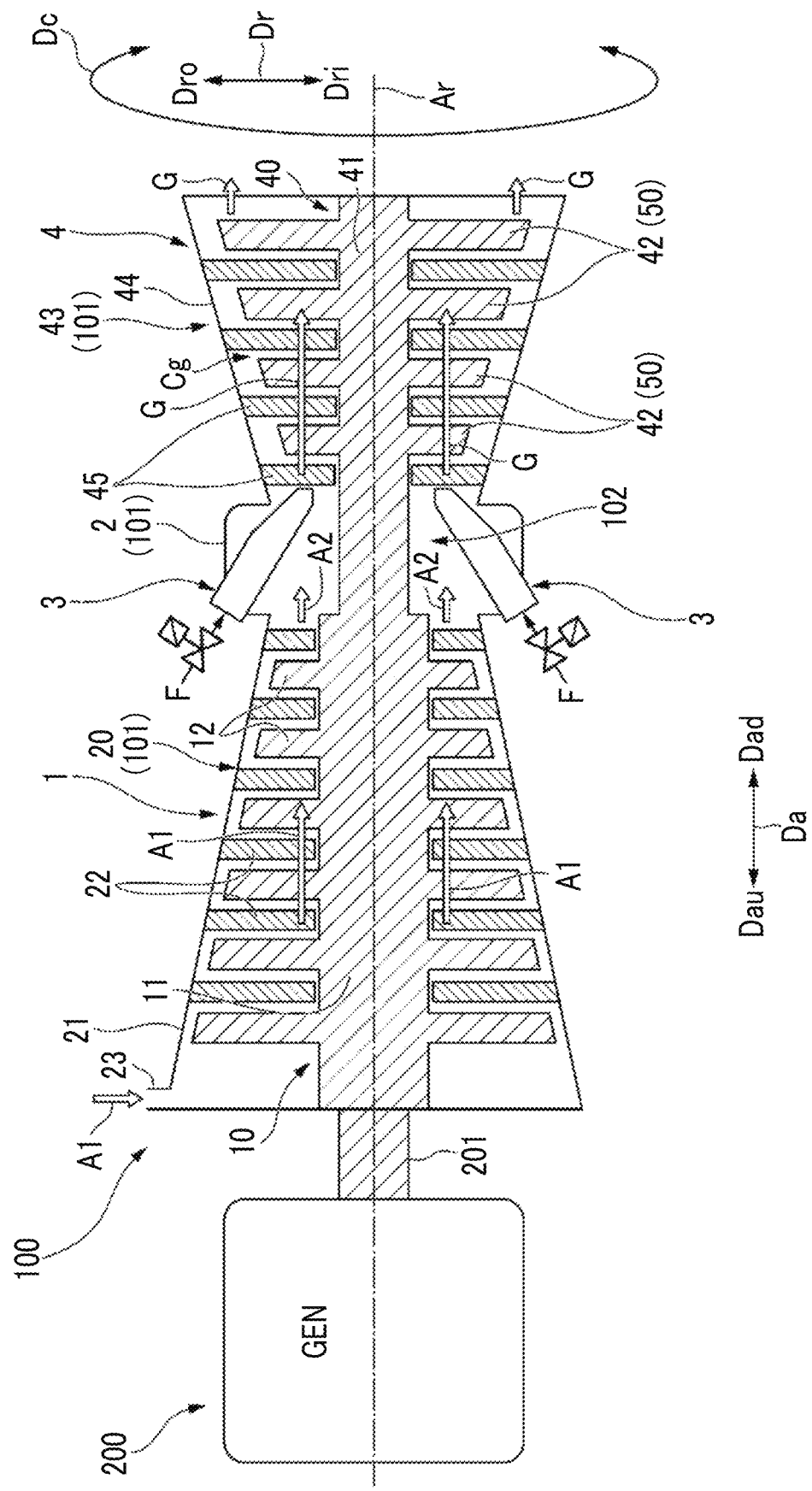
FIG. 1 is a schematic sectional view of a gas turbine according to an embodiment of the present disclosure.

An embodiment of a gas turbine will be described with reference to FIG. 1. As shown in FIG. 1, a gas turbine 100 includes a compressor 1, a middle casing 2, a combustor 3, and a turbine 4.

(Compressor)

The compressor 1 is a device that compresses air introduced from an outside to increase a pressure thereof to a predetermined pressure and that supplies the compressed air to the middle casing 2. The compressor 1 includes a compressor rotor 10 that is rotatable around an axis Ar extending in a horizontal direction, and a compressor casing 20 covering the compressor rotor 10.

Here, a direction in which the axis Ar extends (left-right direction in FIG. 1) is referred to as an "axial direction Da", a circumferential direction with respect to the axis Ar is simply referred to as a "circumferential direction Dc", and a direction perpendicular to the axis Ar is referred to as a "radial direction Dr". In addition, one side (left side in FIG. 1) of both sides in the axial direction Da is referred to as an "axial upstream side Dau", and an opposite side thereof (right side in FIG. 1) is referred to as an "axial downstream side Dad".

In addition, a side close to the axis Ar in the radial direction Dr is referred to as a "radial inner side Dri", and an opposite side thereof is referred to as a "radial outer side Dro". In addition, the air introduced into the compressor 1 and circulated inside the compressor 1 is simply referred to as "air A1", and the air introduced into the middle casing 2 after being compressed by the compressor 1 is referred to as "compressed air A2".

The compressor rotor 10 includes a compressor rotor shaft 11, and a plurality of compressor rotor blade rows 12 that are provided on an outer peripheral surface of the compressor rotor shaft 11 and that are arranged at intervals in the axial direction Da.

The compressor rotor shaft 11 is a rotary shaft that has a columnar shape extending in the axial direction Da and that is rotatable around the axis Ar. All of the plurality of compressor rotor blade rows 12 are provided from an outer peripheral side of the compressor rotor shaft 11, and are integrated with the compressor rotor shaft 11. Each of the compressor rotor blade rows 12 has a plurality of compressor rotor blades arranged at intervals in the circumferential direction Dc.

The compressor casing 20 forms an outer shell of the compressor 1 and the compressor rotor 10 from an outer peripheral side. The compressor casing 20 includes a compressor casing main body 21 that forms a cylindrical shape centered on the axis Ar, an air inlet portion 23 that introduces the air A1 into the compressor casing main body 21, and a plurality of compressor rows 22 that are provided on an inner peripheral surface of the compressor casing main body 21 and that are arranged at intervals in the axial direction Da.

The compressor casing main body 21 is supported by, for example, a compress supporting part (not shown) fixed to a ground or a cradle. The compressor casing main body 21 compresses the air A1 introduced from the air inlet portion 23 inside the compressor casing main body 21 to generate the compressed air A2, and then supplies the compressed air AZ to the middle casing 2. The air inlet portion 23 is provided on the axial upstream side Dau of the compressor casing main body 21.

All of the plurality of compressor stator vane rows 22 are integrated with the compressor casing main body 21. Each of the compressor stator vane rows 22 has a plurality of compressor stator vanes arranged at intervals in the circumferential direction Do. The compressor stator vane rows 22 and the compressor rotor blade rows 12 are alternately arranged in the axial direction Da. The compressed air A2 compressed inside the compressor casing 20 is introduced into the middle casing 2.

(Middle Casing)

The middle casing 2 forms a space inside the middle casing 2 for guiding the compressed air A2 introduced from the compressor 1 to the combustor 3. The middle casing 2 is connected to the compressor casing 20 from the axial downstream side Dad.

(Combustor)

The combustor 3 is a device that generates a high-temperature and high-pressure combustion gas G by using a fuel F supplied from the outside and the compressed air A2 introduced into the middle casing 2 and that supplies the combustion gas G to the turbine 4. The combustor 3 is provided in the middle casing 2.

(Turbine)

The turbine 4 is a device driven by the combustion gas G supplied from the combustor 3. The turbine 4 has a turbine rotor 40 that is rotatable around the axis Ar, and a turbine casing 43 that covers the turbine rotor 40.

The turbine rotor 40 includes a turbine rotor shaft 41, and a plurality of turbine rotor blade rows 42 that are provided on an outer peripheral surface of the turbine rotor shaft 41 and that are arranged at intervals in the axial direction Da. Hereinafter, the turbine rotor shaft 41 is simply referred to as a "rotor shaft 41", and the turbine rotor blade row 42 is simply referred to as a "rotor blade row 42".

The rotor shaft 41 is a rotary shaft that has a columnar shape extending in the axial direction Da and that is rotatable around the axis Ar. All of the plurality of rotor blade rows 42 axe provided from an outer peripheral side of the rotor shaft 41, and are integrated with the rotor shaft 41. Each of the rotor blade rows 42 has a plurality of turbine rotor blades 50 (rotor blade) arranged at intervals in the circumferential direction Do. Hereinafter, the turbine rotor blade 50 is simply referred to as a "rotor blade 50".

The turbine casing 43 forms an outer shell of the turbine 4 and covers the turbine rotor 40 from an outer peripheral side. The turbine casing 43 includes a turbine casing main body 44 that forms a cylindrical shape centered on the axis Ar, and a plurality of turbine stator vane rows 45 that are provided on an inner peripheral surface of the turbine casing main body 44 and that are arranged at intervals in the axial direction Da. Hereinafter, the turbine stator vane row 45 is simply referred to as a "stator vane row 45".

The turbine casing main body 44 is supported by, for example, a turbine supporting part (not shown) fixed to a ground ox a cradle. The turbine casing main body 44 allows the combustion gas @ introduced from the combustor 3 to circulate inside. The combustion gas G is introduced from the axial upstream side Dau of the turbine casing main body 44. All of the plurality of stator vane cows 45 are integrated with the turbine casing main body 44.

Each of the stator vane rows 45 has a plurality of turbine stator vanes arranged at intervals in the Circumferential direction Dc. Hereinafter, the turbine stator vane is simply referred to as a "stator vane". The stator vane rows 45 and the rotor blade rows 42 are alternately arranged in the axial direction Da. The combustion gas G that has finished its work inside the turbine casing main body 44 is discharged from the turbine casing main body 44 toward the axial downstream side Dad.

An annular space between the outer peripheral side of the rotor shaft 41 and an inner peripheral side of the turbine casing main body 44, where the stator vane rows 45 and the rotor blade rows 42 are alternately arranged in the axial direction Da, is a combustion gas passage Cg through which the combustion gas G from the combustor 3 flows. The combustion gas passage Cg is annular around the axis Ar and is long in the axial direction Da.

In the present embodiment, a gas turbine casing 101 is configured by the compressor casing 20, the middle casing 2, and the turbine casing 43. In addition, the compressor rotor 10 and the turbine rotor 40 are positioned on the same axis Ar, and a gas turbine rotor 102 is configured by connecting the compressor rotor 10 and the turbine rotor 40 to each other in the middle casing 2, for example. For example, an output shaft 201 of a generator 200 is connected to an end portion of the gas turbine rotor 102 (compressor rotor 10) on the axial upstream side Dau.

Hereinafter, a schematic operation of the gas turbine 100 including the above configuration will be described. The compressor 1 compresses the air A1 to generate the compressed air A2. The compressed air A2 flows into the combustor 3 via the middle casing 2. The fuel F is supplied to the combustor 3 from the outside.

In the combustor 3, the fuel F is combusted in the Compressed air A2 so that the combustion gas G of which the temperature and the pressure are high is generated. The combustion gas G is sent from the combustor 3 into the turbine casing 43. The turbine rotor 40 is rotated by the combustion gas G. The output shaft 201 of the generator 200 connected to the gas turbine rotor 102 is rotated as the turbine rotor 40 rotates. As a result, the generator 200 generates electricity.

[Embodiment of Rotor Blade]

Figure 2:
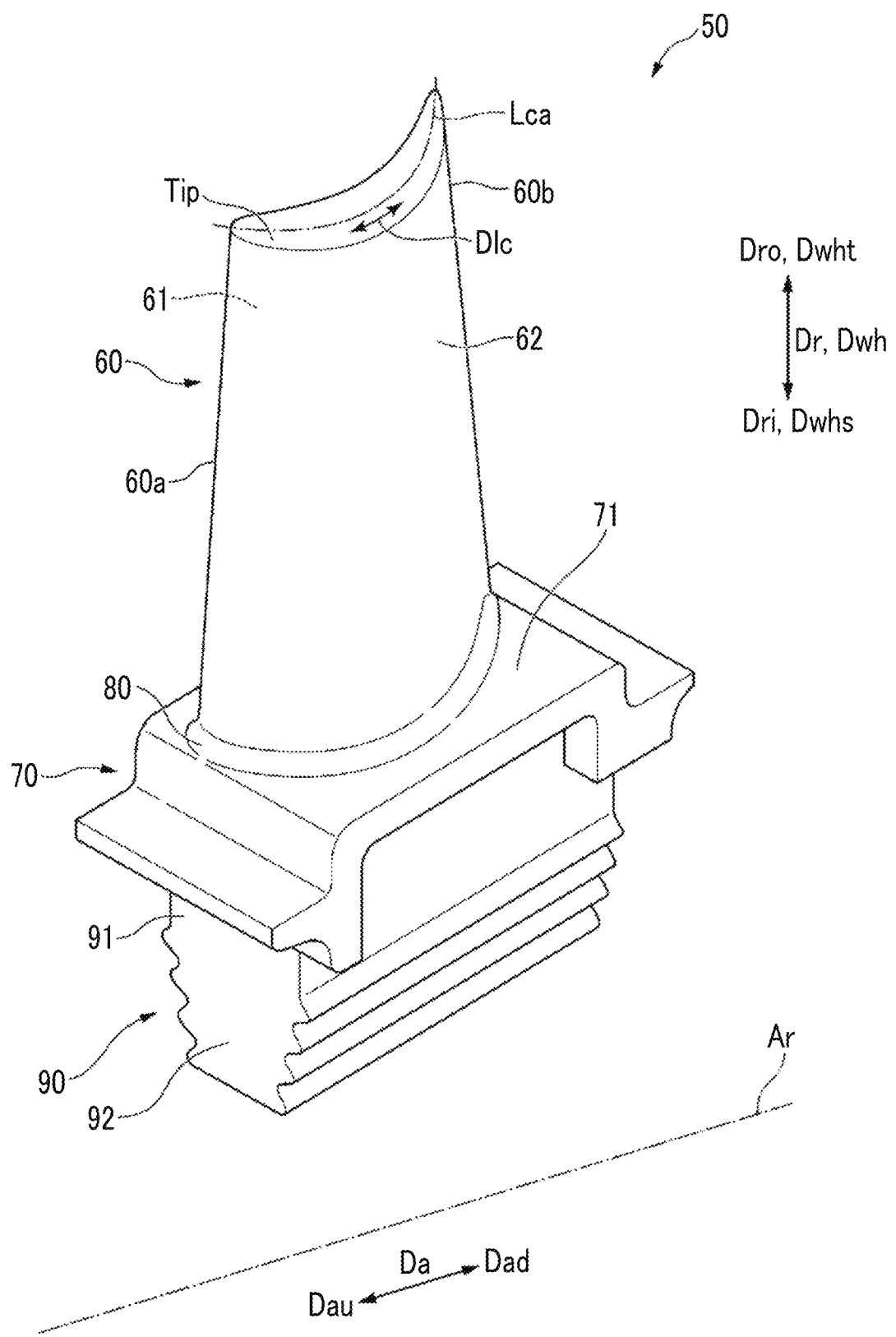
FIG. 2 is a perspective view of a rotor blade according to the embodiment of the present disclosure.
Figure 3:
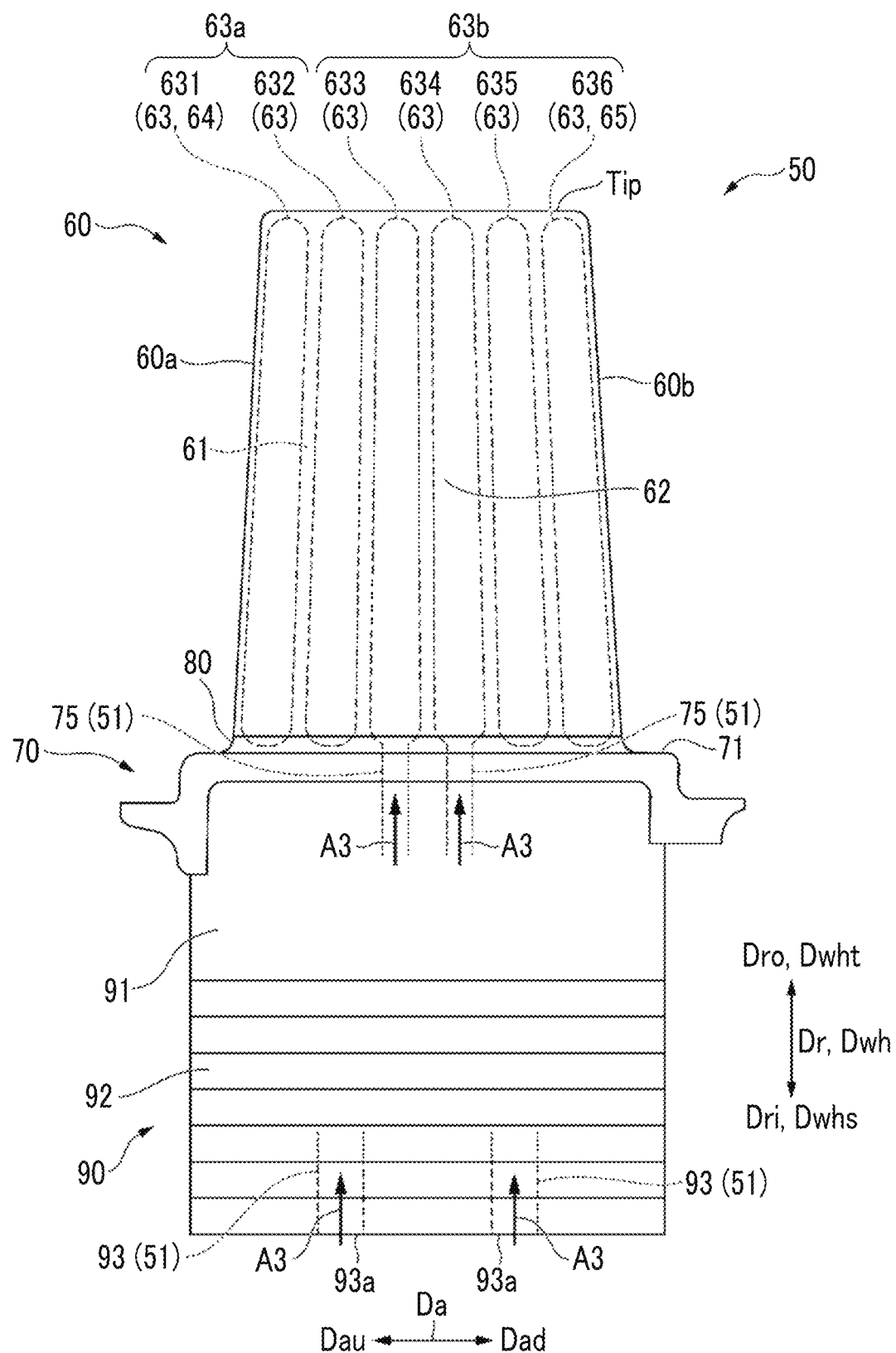
FIG. 3 is a view showing a state of the rotor blade according to the embodiment of the present disclosure when viewed from a dorsal surface side.

An embodiment of the rotor blade 50 of the gas turbine 100 described above will be described with reference to FIGS. 2 to 9. As shown in FIGS. 2 and 3, the rotor blade 50 includes a rotor blade body 60, a platform 70, and a shaft attachment portion 90.

(Rotor Blade Body)

The rotor blade body 60 has an airfoil-shaped cross section and extends in a direction having a directional component perpendicular to the cross section. Hereinafter, the direction is referred to as a "vane height direction Dwh". In a state where the rotor blade 50 is fixed to the rotor shaft 41, the vane height direction Dwh coincides with the radial direction Dr. Here, a side of the rotor shaft 41 to the rotor blade body 60 in the vane height direction Dwh is referred to as a "hub side Dwhs", and an opposite side thereof is referred to as a "tip side Dwht".

The rotor blade body 60 has an anterior edge 60a and a posterior edge 60b that extend in the vane height direction Dwh and that face sides that are opposite to each other, a ventral surface 61 and a dorsal surface 62 that connect the anterior edge 60a and the posterior edge 60b to each other and that face sides that are opposite to each other, and four or more cooling passages 63 at are positioned between the ventral surface 61 and the dorsal surface 62 and that extend in the vane height direction Dwh.

The anterior edge 60a is an edge of the rotor blade 50 that is closest to the axial upstream side Dau in a state where the rotor blade 50 is fixed to the rotor shaft 41. The posterior edge 60b is an edge of the rotor blade 50 that is closest to the axial downstream side Dad in a state where the rotor blade 50 is fixed to the rotor shaft 41. The ventral surface 61 is a concavely curved pressure surface. The dorsal surface 62 is a suction surface that is curved in a protruding shape toward a side where the ventral surface 61 is recessed and that faces a side opposite to the ventral surface 61.

The four or more cooling passages 63 are arranged in a direction in which a camber line Lca connecting the anterior edge 60a and the posterior edge 60b extends. Hereinafter, the direction is referred to as a "camber line direction Dlc". The rotor blade body 60 of the present embodiment has six cooling passages 63. A more detailed configuration of the rotor blade body 60 will be described later.

(Platform)

The platform 70 is a pedestal that supports the rotor blade body 60. The platform 70 is provided at an end portion of the rotor blade body 60 on the hub side Dwhs. The platform 70 is a plate-like member that extends in a direction having a component perpendicular to the vane height direction Dwh from the end portion of the rotor blade body 60 on the hub side Dwhs.

A gas path surface 71 that faces the tip side Dwht and that comes into contact with the combustion gas G is formed on the platform 70. The gas path surface 71 is a surface that extends in a direction having a component perpendicular to the vane height direction Dwh.

Here, a connecting portion with the gas path surface 71 in the ventral surface 61 and a connecting portion with the gas path surface 71 in the dorsal surface 62 form a fillet portion 80. The ventral surface 51 of the fillet portion 80 extends in a direction away from the dorsal surface 62 as the ventral surface 61 approaches the gas path surface 71 in the vane height direction Dwh. The dorsal surface 62 of the fillet portion 80 extends in a direction away from the ventral surface 61 as the dorsal surface 62 approaches the gas path surface 71 in the vane height direction Dwh.

(Shaft Attachment Portion)

The shaft attachment portion 90 fixes the platform 70 to the rotor shaft 41. The shaft attachment portion 90 includes a shank 91 extending from the platform 70 to a side opposite to the rotor blade body 60 in the vane height direction Dwh, and a vane root 92 extending from the shank 91 to a side opposite to the rotor blade body 60 in the vane height direction Dwh. A cross-sectional shape of the vane root 92 forms a shape of a Christmas tree. The vane root 92 is fitted to a vane root groove (not shown) of the rotor shaft 41 (see FIG. 1).

Here, the rotor blade 50 has a rotor blade cooling passage 51 therein. A cooling fluid A3 is supplied to the rotor blade cooling passage 51 from an outside of the rotor blade 50. The rotor blade 50 is cooled by the cooling fluid A3 circulating inside the rotor blade cooling passage 51.

The cooling fluid A3 in the present embodiment is a part of the compressed air A2 introduced from the compressor 1 into the middle casing 2. The compressed air A2 as the cooling fluid A3 is supplied into the rotor blade cooling passage 51 through a cooling fluid introduction path (not shown) formed inside the rotor shaft 41.

The rotor blade cooling passage 51 is configured by a plurality of the cooling passages 63 formed inside the rotor blade body 60, a plurality of platform cooling passages 75 formed inside the platform 70, and a plurality of shaft attachment portion cooling passages 93 formed in the shaft attachment portion 90.

Details of the cooling passage 63 will be described later. The platform cooling passage 75 and the shaft attachment portion cooling passage 93 respectively extend in the vane height direction Dwh. One shaft attachment portion cooling passage 93 communicates with any one or more platform cooling passages 75 of the plurality of platform cooling passages 75.

The shaft attachment portion cooling passage 93 has a fluid inlet 93a that is open toward the rotor shaft 41 on the hub side Dwhs. The fluid inlet 93a is connected to the cooling fluid introduction path. The cooling fluid A3 flowing in from the cooling fluid introduction path flows into the shaft attachment portion 90 through the fluid inlet 93a.

The cooling fluid A3 that has circulated inside the shaft attachment portion cooling passage 93 flows into the platform cooling passage 75 of the platform 70. The cooling fluid A3 that has circulated inside the platform cooling passage 75 flows into the cooling passage 63 to cool the rotor blade body 60.

The rotor blade body 60 described above will be described in more detail.

Figure 4:
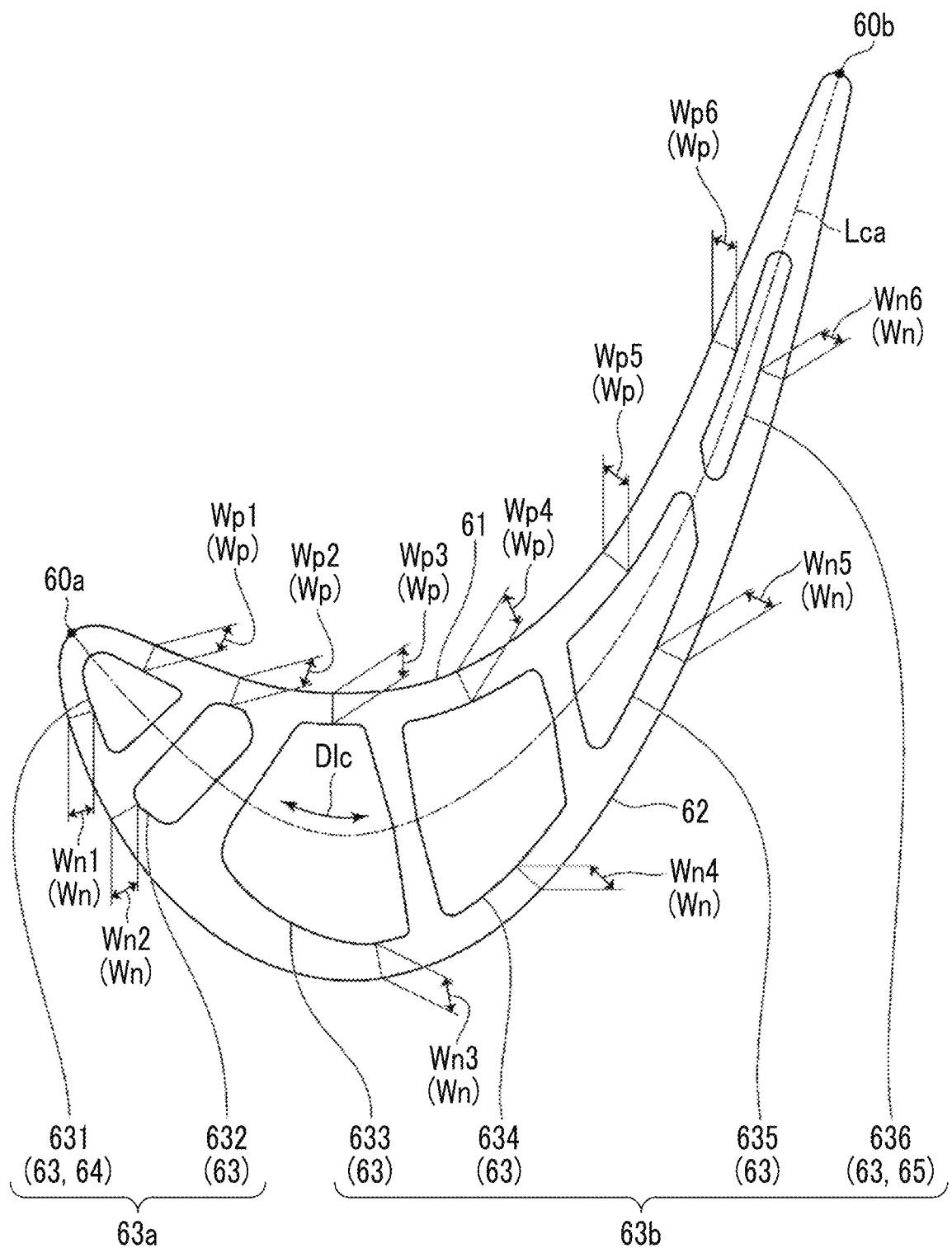
FIG. 4 is a view showing a cross section of a rotor blade body according to the embodiment of the present disclosure on a plane perpendicular to a vane height direction.

As shown in FIGS. 3 and 4, among the six cooling passages 63 of the rotor blade body 60, an anterior cooling passage 64 closest to a side of the anterior edge 60a is referred to as a first cooling passage 631. The cooling passage 63 adjacent to a side of the posterior edge 60b of the first cooling passage 631 is referred to as a second cooling passage 632. In addition, the cooling passage 63 adjacent to a side of the posterior edge 60b of the second cooling passage 632 is referred to as a third cooling passage 633. In addition, the cooling passage 63 adjacent to a side of the posterior edge 60b of the third cooling passage 633 is referred to as a fourth cooling passage 634. In addition, the cooling passage 63 adjacent to a side of the posterior edge 60b of the fourth cooling passage 634 is referred to as a fifth cooling passage 635. In addition, the cooling passage 63 adjacent to a side of the posterior edge 60b of the fifth cooling passage 635 is referred to as a sixth cooling passage 636. The sixth cooling passage 636 is a posterior cooling passage 65 closest to the side of the posterior edge 60b among the six cooling passages 63.

In the present embodiment, among a plurality of combinations (five sets) obtained by selecting two adjacent cooling passages 63 from the six cooling passages 63 (first cooling passage 631 to sixth cooling passage 636) arranged in the camber line direction Dlc, at least one set of the cooling passages 63 communicate with each other. In FIGS. 3 and 4, an illustration of a state where adjacent cooling passages 63 communicate with each other is omitted.

The anterior cooling passage 64 and one or more cooling passages 63 that are connected to the anterior cooling passage 64 in the camber line direction Dlc among the six cooling passages 63 form an anterior-side cooling passage group 63a. In addition, the posterior cooling passage 65 positioned closest to the side of the posterior edge 60b and one or more cooling passages 63 that are connected to the posterior cooling passage 65 in the camber line direction Dlc among the six cooling passages 63 form a posterior-side cooling passage group 63b.

In the present embodiment, the anterior-side cooling passage group 63a is configured by the first cooling passage 631 serving as the anterior cooling passage 64 and the second cooling passage 632. In addition, the posterior-side cooling passage group 63b is configured by the third cooling passage 633, the fourth cooling passage 634, the fifth cooling passage 635, and the sixth cooling passage 636 serving as the posterior cooling passage 65.

Therefore, the cooling passages 63 in the rotor blade body 60 are configured by the anterior-side cooling passage group 63a and the posterior-side cooling passage group 63b. In the present embodiment, the third cooling passage 633 and the fourth cooling passage 634 communicate with the platform cooling passage 75 at end portions on the hub side Dwhs in the vane height direction Dwh.

Here, a distance between an inner peripheral surface in each cooling passage 63 and the dorsal surface 62 is referred to as "dorsal wall thickness Wn", and a distance between the inner peripheral surface in each cooling passage 63 and the ventral surface 61 is referred to as a. "ventral wall thickness Wp". The dorsal wall thickness Wn of the present embodiment indicates shortest distance between the inner peripheral surface in the cooling passage 63 and the dorsal surface 62, and the ventral wall thickness Wp indicates a shortest distance between the inner peripheral surface in the cooling passage 63 and the ventral surface 61.

As shown in FIG. 4, in the present embodiment, the dorsal wall thickness in in the first cooling passage 631 is referred to as a "first dorsal wall thickness Wn1", and the ventral wall thickness Wp in the first cooling passage 631 is referred to as a "first ventral wall thickness Wp1" In addition, the dorsal wall thickness Wn in the second cooling passage 632 is referred to as a "second dorsal wall thickness Wn2", and the ventral wall thickness Wp in the second cooling passage 632 is referred to as a "second ventral wall thickness Wp2". In addition, the dorsal wall thickness in in the third cooling passage 633 is referred to as a "third dorsal wall thickness Wn3", and the ventral wall thickness Wp in the third cooling passage 633 is referred to as a "third ventral wall thickness Wp3". In addition, the dorsal wall thickness Wn in the fourth cooling passage 634 is referred to as a "fourth dorsal wall thickness Wn4", and the ventral wall thickness Wp in the fourth cooling passage 634 is to as a "fourth ventral wall thickness Wp4". In addition, the dorsal wall thickness Wn in the fifth cooling passage 635 is referred to as a "fifth dorsal wall thickness Wn5", and the ventral wall thickness Wp in the fifth cooling passage 635 is referred to as a "fifth ventral wall thickness Wp5". In addition, the dorsal wall thickness Wn in the sixth cooling passage 636 is referred to as a "sixth dorsal wall thickness Wn6", and the ventral wall thickness Wp in the sixth cooling passage 636 is referred to as a "sixth ventral wall thickness Wp6".

In addition, a ratio of the ventral wall thickness Wp to the dorsal wall thickness Wn referred to as a "ventral/dorsal thickness ratio Rpn" The ventral/dorsal wall thickness ratio Ron is obtained by dividing the ventral wall thickness Wp by the dorsal wall thickness Wn.

In the present embodiment, the ventral/dorsal wall thickness ratio Rpn in the first cooling passage 631 (first ventral wall thickness Wp1/first dorsal wall thickness Wn1) is referred to as a "first ventral/dorsal wall thickness ratio Rpn1". In addition, the ventral/dorsal wall thickness ratio Rpn in the second cooling passage 632 (second ventral wall thickness Wp2/second dorsal wall thickness Wn2) is referred to as a "second ventral/dorsal wall thickness ratio Rpn2". In addition, the ventral/dorsal wall thickness ratio Rpn in the third cooling passage 633 (third ventral wall thickness Wp3/third dorsal wall thickness Wn3) is referred to as a "third ventral/dorsal wall thickness ratio Rpn3". In addition, the ventral/dorsal wall thickness ratio Rpn in the fourth cooling passage 634 (fourth ventral wall thickness Wp4/fourth dorsal wall thickness Wn4) is referred to as a "fourth ventral/dorsal wall thickness ratio Rpn4". In addition, the ventral/dorsal wall thickness ratio Ron in the fifth cooling passage 635 (fifth ventral wall thickness Wp5/fifth dorsal wall thickness Wn5) is referred to as a "fifth ventral/dorsal wall thickness ratio Rpn5". In addition, the ventral/dorsal wall thickness ratio Rpn in the sixth cooling passage 636 (sixth ventral wall thickness Wp6/sixth dorsal wall thickness Wn6) is referred to as a "sixth ventral/dorsal wall thickness ratio Rpn6".

Figure 5:
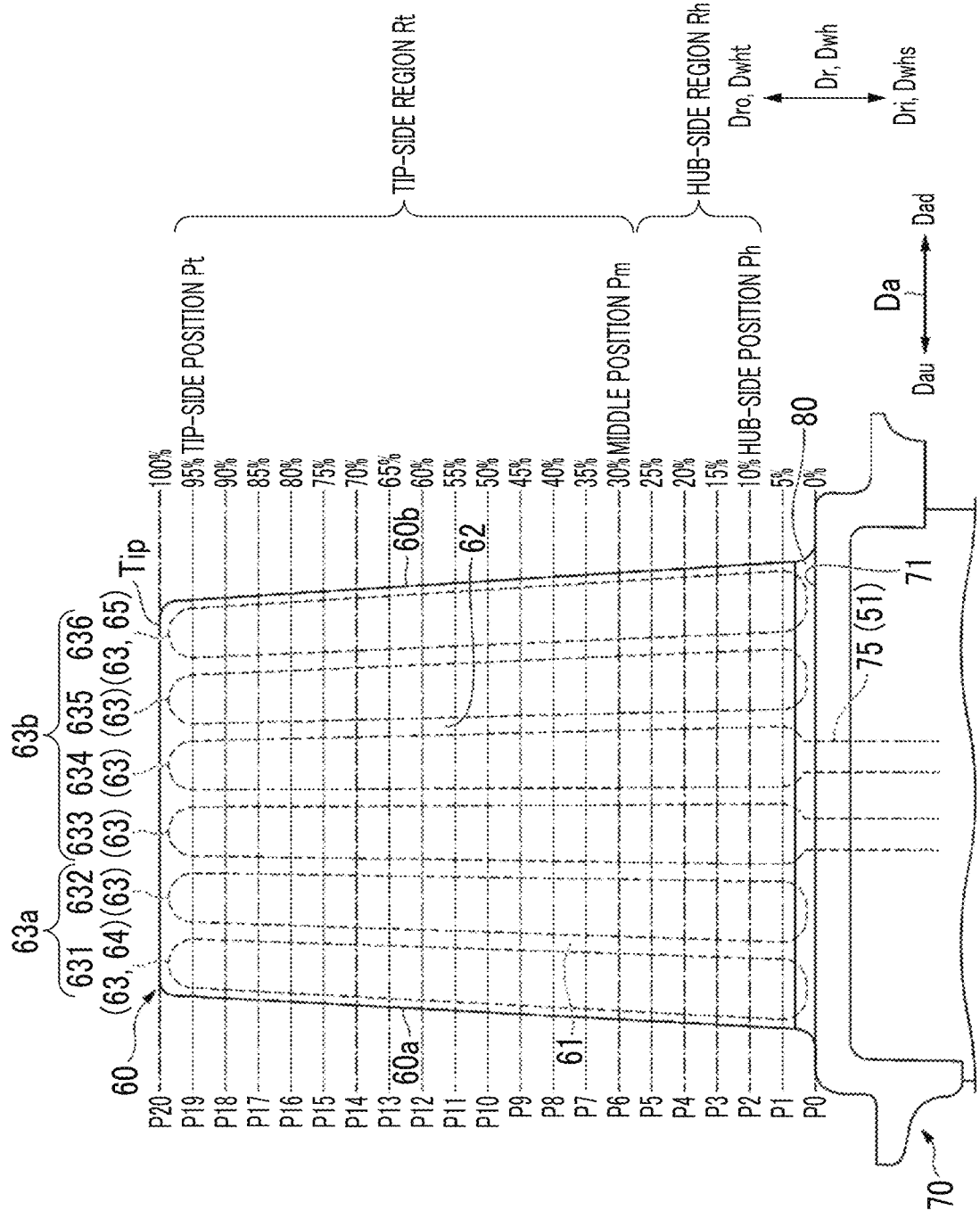
FIG. 5 is a view showing each position and each region in a vane height of the rotor blade body according to the embodiment of the present disclosure.

In addition, as shown in FIG. 5, a vane height from a position of the gas path surface 71 of the platform 70 to a position of a tip-side tip Tip of the rotor blade body 60 connected to the gas path surface 71 and extending in the vane height direction Dwh is set to 100%. At this time, a position in a range of 5% to 15% of the vane height from the position of the gas path surface 71 is referred to as a "hub-side position Ph", a position in a range of 25% to 35% of the vane height from the position of the gas path surface 71 is referred to as a "middle position Pm", and a position in a range of 90% to 100% of the vane height from the position of the gas path surface 71 is referred to as a "tip-side position Pt".

In addition, a region between the hub-side position Ph and the middle position Pm that does not include the middle position Pm is referred to as a "hub-side region Rh", and a region between the middle position Pm and the tip-side position Pt that includes the middle position Pm is referred to as a "tip-side region Rt". The hub-side position Ph in the present embodiment is a position of 10%, the middle position Pm is a position of 30%, and the tip-side position Pt is a position of 95%. Therefore, the bub-side region Rh in the present embodiment is a region of 10% or more and less than 30%, and the tip-side region Rt is a region of 30% or more and 95% or less.

Hereinafter, the ventral wall thickness Wp, the dorsal wall thickness Wn, and the ventral/dorsal wall thickness ratio Rpn in each of the cooling passages 63 of the rotor blade body 60 in the vane height direction Dwh will be described with reference to FIGS. 5 to 9.

As shown in FIG. 5, in order to show a transition of the ventral wall thickness Wp, the dorsal wall thickness Wn, and the ventral/dorsal wall thickness ratio Rpn in each of the cooling passages 63 in a vane cross section in a case where the rotor blade body 60 is virtually cut in a direction perpendicular to the vane height direction Dwh, the position (0%) of the gas path surface 71 and the position (100%) of the tip-side tip Tip were divided at equal intervals. In the present embodiment, the position of the gas path surface 71 and the position of the tip-side tip Tip are divided into twenty equal parts at 5% increments.

In the present embodiment, the position of the gas path surface 71, that is, the position (0%) of the end portion of the rotor blade body 60 on the hub side Dwhs, is referred to as a "reference position P0". In addition, a position of 5% from the reference position P0 is referred to as a "first position P1". In addition, a position of 10% from the reference position P0 is referred to as a "second position P2", In addition, a position of 15% from the reference position P0 is referred to as a "third position P3". In addition, a position of 20% from the reference position P0 is referred to as a "fourth position P4". In addition, a position of 25% from the reference position P0 is referred to as a "fifth position P5". In addition, a position of 30% from the reference position P0 is referred to as a "sixth position P6". In addition, a position of 35% from the reference position P0 is referred to as a "seventh position P7". In addition, a position of 40% from the reference position P0 is referred to as an "eighth position P5". In addition, a position of 45% from the reference position P0 is referred to as a "ninth position P9", In addition, a position of 50% from the reference position P0 is referred to as a "tenth position P10". In addition, a position of 55% from the reference position P0 is referred to as an "eleventh position P11". In addition, a position of 60% from the reference position P0 is referred to as "twelfth position P12". In addition, a position of 65% from the reference position P0 is referred to as a "thirteenth position P13". In addition, a position of 70% from the reference position P0 is referred to as a "fourteenth position P14". In addition, a position of 75% from the reference position P0 is referred to as a "fifteenth position P15", In addition, a position of 80% from the reference position P0 referred to as a "sixteenth position P16". In addition, a position of 85% from the reference position P0 is referred to as a "seventeenth position P17". In addition, a position of 90% from the reference position P0 is referred to as an "eighteenth position P18". In addition, a position of 95% from the reference position P0 is referred to as a "nineteenth position P19". In addition, a position of 100% from the reference position P0, that is, the position of the tip-side tip Tip, is referred to as a "tip position P20".

Therefore, in the present embodiment, the second position P2 is the hub-side position Ph, the sixth position P6 is the middle position Pm, and the nineteenth position P19 is the tip-side position Pt.

Hereinafter, a "reference thickness" indicated by a scale line of a solid line in each of graphs of the ventral wall thickness Wp and the dorsal wall thickness Wn shown in the drawings indicates the same thickness (dimension). In addition, dimensions corresponding to intervals between the scale lines in each of the graphs of the ventral wall thickness Wp and the dorsal wall thickness Win shown in the drawings are the same in any graph.

Figure 6:
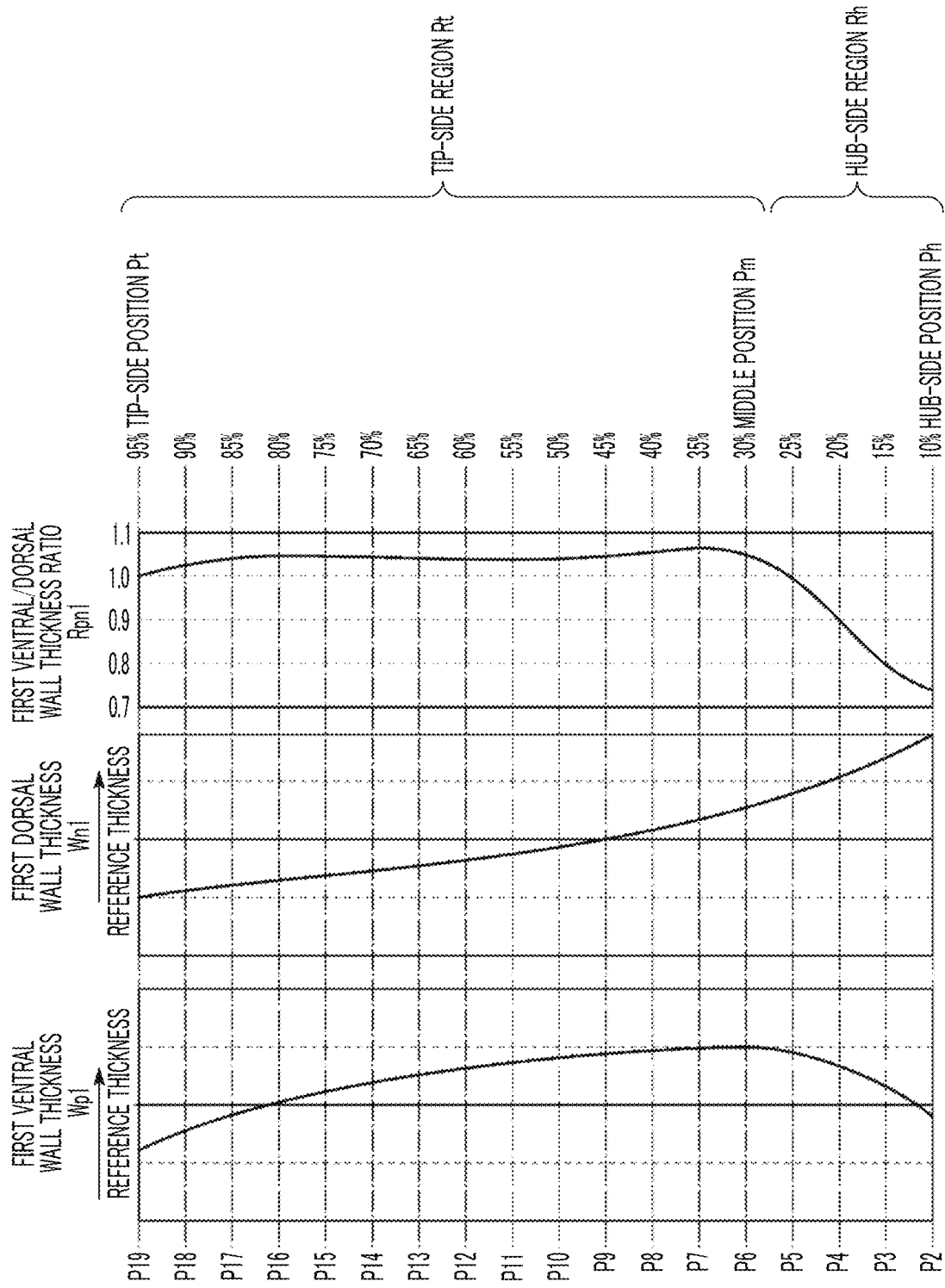
FIG. 6 is a graph showing a ventral wall thickness, a dorsal wall thickness, and a ventral/dorsal wall thickness ratio in a first cooling passage according to the embodiment of the present disclosure in the vane height direction.
Figure 7:
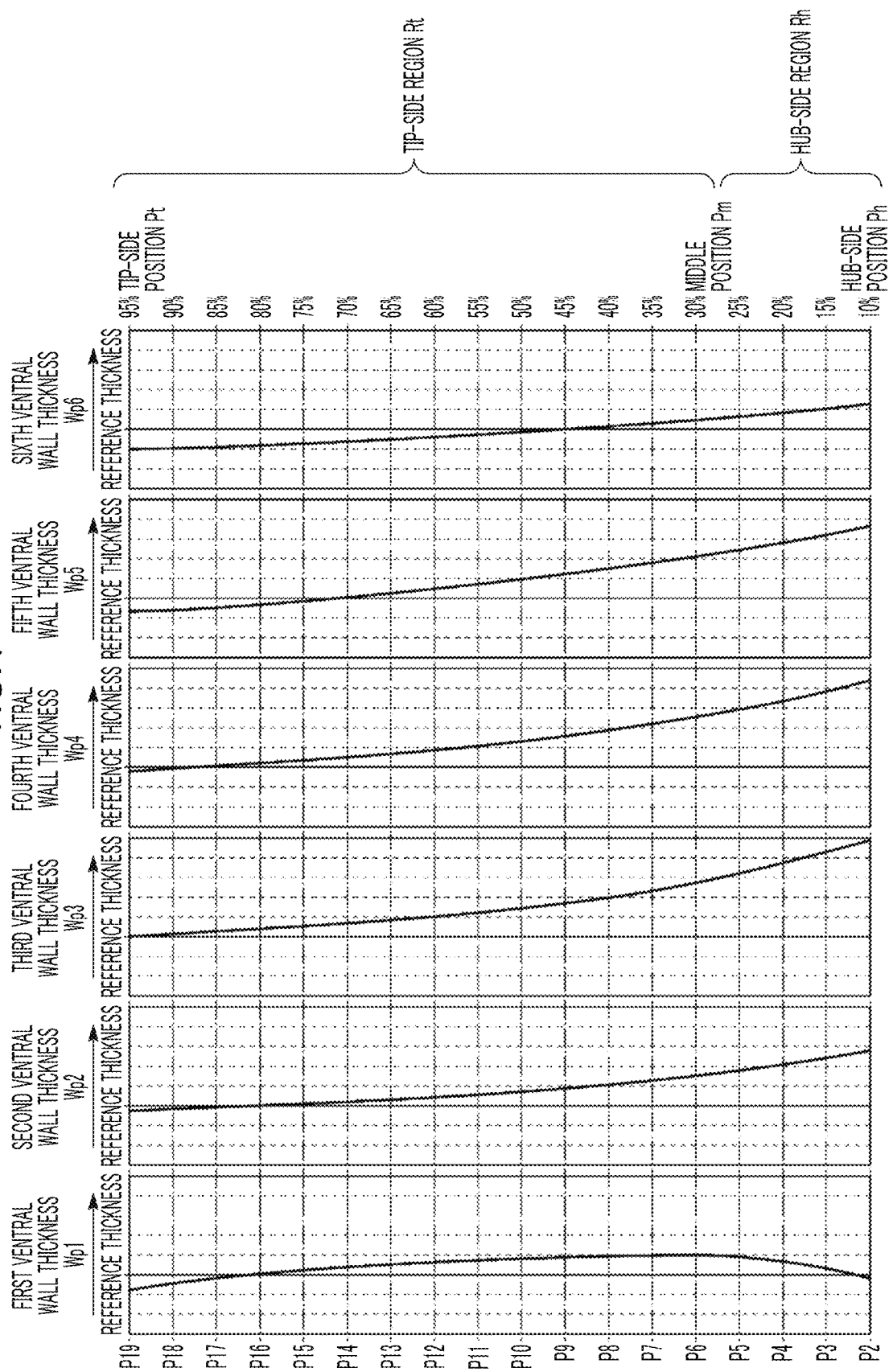
FIG. 7 is a graph showing a ventral wall thickness in each of cooling passages (first cooling passage to sixth cooling passage) according to the embodiment of the present disclosure in the vane height direction.

As shown in FIGS. 6 and 7, the first ventral wall thickness Wp1 in the first cooling passage 631 increases from the tip-side position Pt toward the middle position Pm, is at its maximum at the middle position Pm, and decreases from the middle position Pm toward the hub-side position Ph.

Figure 8:
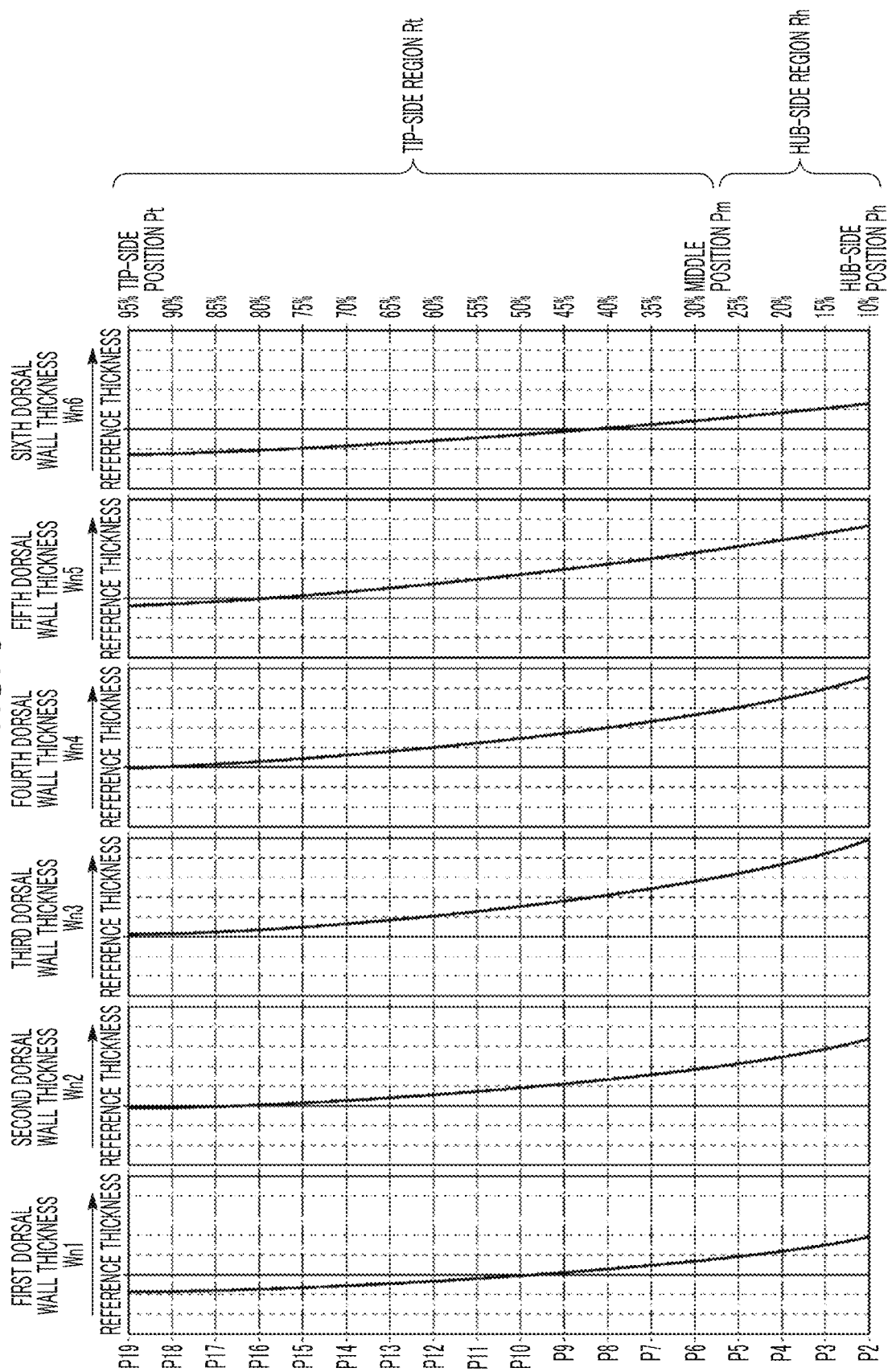
FIG. 8 is a graph showing a dorsal wall thickness in each of the cooling passages (first cooling passage to sixth cooling passage) according to the embodiment of the present disclosure in the vane height direction.

As shown in FIGS. 6 and 8, the first dorsal wall thickness Wn1 in the first cooling passage 631 monotonically increases from the tip-side position Pt toward the hub-side position Ph. The first ventral wall thickness Wp1 at the middle position Pm in the first cooling passage 631 as the anterior cooling passage 64 is greater than the first ventral wall thickness Wp1 at any position among the first ventral wall thicknesses Wp1 to the first cooling passage 631 in the vane height direction Dwh, except for the middle position Pm.

As shown in FIG. 6, the first ventral/dorsal wall thickness ratio Rpn1 of the tip-side region Rt changes with a change of the vane height direction Dwh.

Meanwhile, the first ventral/dorsal wall thickness ratio Rpn1 of the hub-side region Rh decreases from the middle position Pm toward the hub side Dwhs in the vane height direction Dwh.

That is, in the first cooling passage 631, the first ventral wall thickness Wp1 at any position in the hub-side region Rh in the vane height direction Dwh is smaller than the first ventral wall thickness Wp1 at any position in the tip-side region Rt in the vane height direction Dwh. In addition, in the first cooling passage 631, the first ventral/dorsal wall thickness ratio Rpn1 at any position in the hub-side region Rh in the vane height direction Dwh is smaller than the first ventral/dorsal wall thickness ratio Rpn1 at any position in the tip-side region Rt in the vane height direction Dwh.

That an average first ventral/dorsal wall thickness ratio Rpn1 in the hub-side region Rh in the vane height direction Dwh is smaller than an average first ventral/dorsal wall thickness ratio Rpn1 in the tip-side region Rt in the vane height direction Dwh. Further, a ratio of a change amount of the first ventral/dorsal wall thickness ratio Rpn1 to a change amount of the vane height direction Dwh in the hub-side region Rh is larger than a ratio of a change amount of the first ventral/dorsal wall thickness ratio Rpn1 to a change amount of the vane height direction Dwh in the tip-side region Rt.

Here, the first ventral/dorsal wall thickness ratio Rpn1 at the second position P2 (hub-side position Ph) is 74%, and the first ventral/dorsal wall thickness ratio Rpn1 at the third position P3 is 80%. Therefore, the rotor blade body 60 includes a portion that includes a part of the hub-side region Rh in the first cooling passage 631 and where the first ventral/dorsal wall thickness ratio Rpn1 is less than 80%.

As shown in FIGS. 7 and 8, each ventral wall thickness Wp (second ventral wall thickness Wp2 to sixth ventral wall thickness Wp6) and each dorsal wall thickness Wn (second dorsal thickness Wn2 to sixth dorsal thickness Wn6) of the second cooling passage 632 to the sixth cooling passage 636 monotonically increase from the tip-side position Pt toward the hub-side position Ph.

Figure 9:
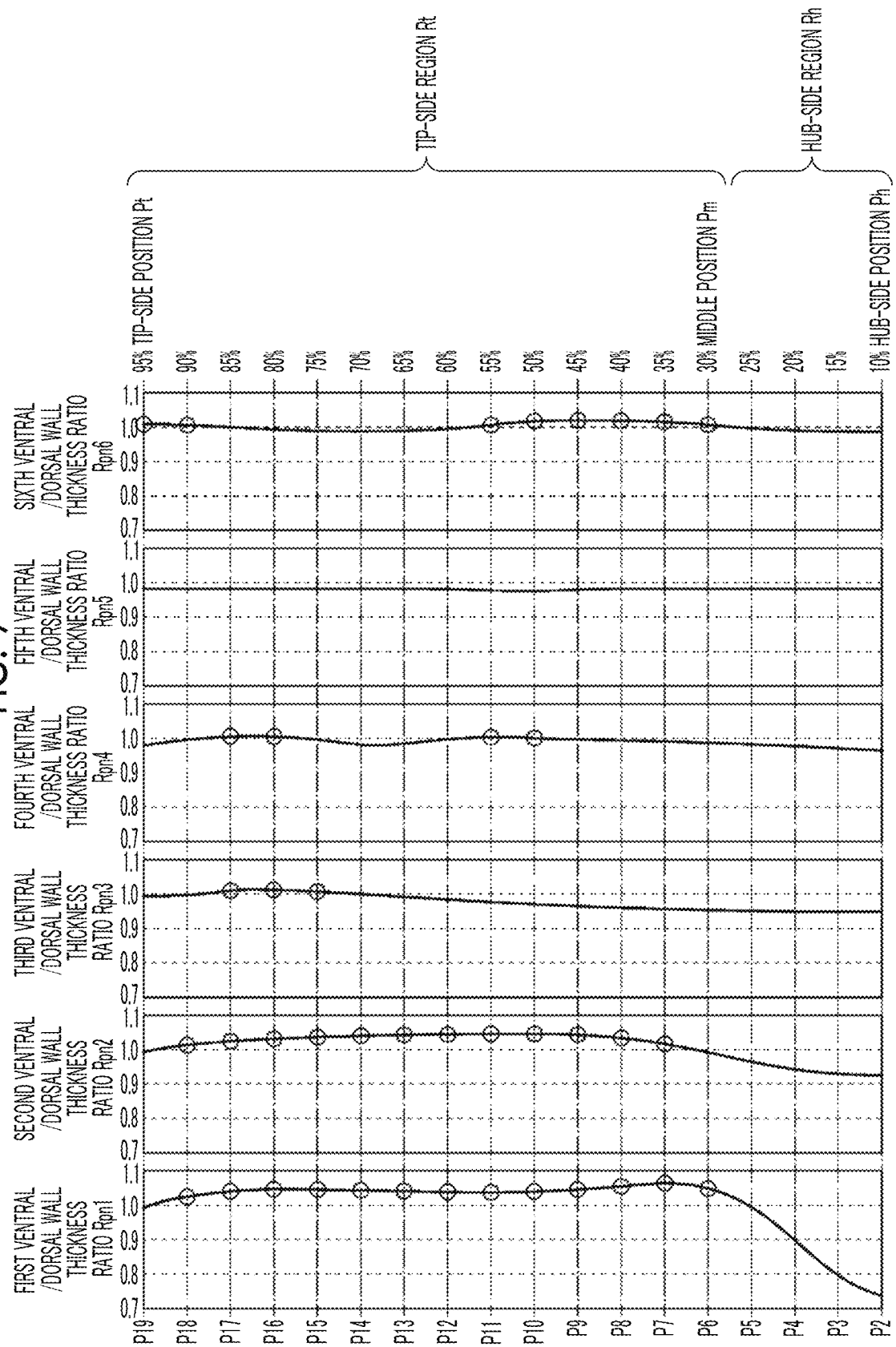
FIG. 9 is a graph showing a ventral/dorsal wall thickness ratio in each of the cooling passages (first cooling passage to sixth cooling passage) according to the embodiment of the present disclosure in the vane height direction.

FIG. 9 shows a list of the ventral/dorsal wall thickness ratios Rpn at each position (second position P2 to nineteenth position P19) of each of the cooling passages 63 (first cooling passage 631 to sixth cooling passage 636) in the vane height direction Dwh. A portion (position) indicating the ventral/dorsal wall thickness ratio Rpn of 100% or more among the ventral/dorsal wall thickness ratios Rpn is enclosed by a circle.

As shown in FIG. 9, a portion of 100% or more of the ventral/dorsal wall thickness ratio Rpn for each of the cooling passages 63 (first cooling passage 631 and second cooling passage 632) included in the anterior-side cooling passage group 63a and for each of positions (second position P2 to nineteenth position P19) in the vane height direction Dwh is larger than a portion of 100% or more of the ventral/dorsal wall thickness ratio Ron for each of the cooling passages 63 (third cooling passage 633 to sixth cooling passage 836) included in the posterior-side cooling passage group 63b and for each of the positions in the vane height direction Dwh.

Here, as shown in FIGS. 7 and 8, the ventral wall thickness Wp (first ventral wall thickness Wp1 and second ventral wall thickness Wp2) and the dorsal wall thickness Wn (first dorsal wall thickness Wn1 and second dorsal wall thickness Wn2) at any position in the hub-side region Rh in the anterior-side cooling passage group 63a in the vane height direction Dwh are reduced from the cooling passage 63 (second cooling passage 632) positioned closest to the side of the posterior edge 60b toward the anterior cooling passage 64 (first cooling passage 631) among the cooling passages 63 arranged in the anterior-side cooling passage group 63a in the camber line direction Dlc.

In addition, the ventral wall thickness Wp (third ventral wall thickness Wp3 to sixth ventral wall thickness Wp6) and the dorsal wall thickness Wn (third dorsal wall thickness Wn3 to sixth dorsal wall thickness Wn6) at any position in the hub-side region Rh in the posterior-side cooling passage group 63b in the vane height direction Dwh are reduced from the cooling passage 63 (third cooling passage 633) positioned closest to the side of the anterior edge 60a toward the posterior cooling passage 65 (sixth cooling passage 636) among the cooling passages 63 arranged in the posterior-side cooling passage group 63b in the camber line direction Dlc.

(Effects of Operation)

The rotor blade body 60 of the rotor blade 50 and the platform 70 connected to the rotor blade body 60 are exposed to the high-temperature and high-pressure combustion gas G during an operation of the gas turbine 100. The rotor blade body 60 and the platform 70 are thermally elongated by the combustion gas G. Since the rotor blade body 60 is connected to the platform 70, a free thermal elongation is restricted by the rotor blade body 60. That is, the thermal elongation of the platform 70 is restrained by the rotor blade body 60.

Further, of the ventral surface 61 and the dorsal surface 62 in the rotor blade body 60 having the airfoil-shaped cross section, the dorsal surface 62 has a higher thermal load due to the combustion gas G. For this reason, the rotor blade body 60 may be deformed such that the dorsal surface 62 is more thermally elongated than the ventral surface 61 and the anterior edge 60a and the posterior edge 60b approach each other in the axial direction Da.

For this reason, in the platform 70, a higher thermal stress is generated in the vicinity of a connecting portion with the ventral surface 61 of the rotor blade body 60 than in the vicinity of a connecting portion with the dorsal surface 62. As a result, there is a possibility that the platform 70 will be damaged. In particular, in the platform 70, the thermal stress is concentrated in the vicinity of a connecting portion with the anterior edge 60a of the rotor blade body 60 on the ventral surface 61, and a probability of damage occurring in this portion is high.

According to a configuration of the rotor blade 50 according to the above-described embodiment, in the first cooling passage 631, the first ventral/dorsal wall thickness ratio Rpn1 at any position in the hub-side region Rh in the vane height direction Dwh is smaller than the first ventral/dorsal wall thickness ratio Rpn1 at any position in the tip-side region Rt in the vane height direction Dwh.

Accordingly, rigidity of the rotor blade body 60 on a ventral surface 61 side can be reduced to be lower than rigidity on a dorsal surface 62 side. Therefore, the ventral surface 61 side of the rotor blade body 60 can relieve the restraint of thermal elongation of the platform more than the dorsal surface 62 side. In particular, the rigidity of the rotor blade body 60 on an anterior edge 60a side on the ventral surface 61 side can be reduced compared to the rigidity of the rotor blade body 60 on the dorsal surface 62 side. Therefore, it is possible to reduce the thermal stress generated in the vicinity of the connecting portion with the ventral surface 61 of the rotor blade body 60 in the platform 70, and thus, it is possible to improve durability of the rotor blade 50.

In addition, an average ventral/dorsal wall thickness ratio Rpn in the hub-side region Rh in the first cooling passage 631 is smaller than an average ventral/dorsal wall thickness ratio Rpn in the tip-side region Rt in the first cooling passage 631. Accordingly, the rigidity of the rotor blade body 50 on the ventral surface 61 side can be reduced in a well-balanced manner. In particular, the rigidity of the rotor blade body 60 on the anterior edge 60a side on the ventral surface 61 side can be reduced in a well-balanced manner.

In addition, the portion of 100% or more of the ventral/dorsal wall thickness ratio Rpn for each of the cooling passages 63 of the anterior-side cooling passage group 63a and for each of a plurality of positions in the vane height direction Dwh is larger than the portion of 100% or more of the ventral/dorsal wall thickness ratio Rpn for each of the cooling passages 63 of the posterior-side cooling passage group 63b and for each of the plurality of positions in the vane height direction Dwh. Accordingly, the rigidity of the rotor blade body 60 on the anterior edge 60a side can be increased as compared with rigidity of the posterior-side cooling passage group 63b.

In addition, the ventral wall thickness Wp at any position in the hub-side region Rh in the anterior-side cooling passage group 63a in the vane height direction Dwh decreases from the cooling passage 63 positioned closest to the side of the posterior edge 60b toward the anterior cooling passage 64 in the anterior-side cooling passage group 63a. That is, the ventral wall thickness Wp in the first cooling passage 631 is smaller than the ventral wall thickness in the second cooling passage 632. Accordingly, the rigidity of the rotor blade body 60 at any position in the hub-side region Rh in the anterior-side cooling passage group 63a decreases from the cooling passage 63 positioned closest to the side of the posterior edge 60b toward the anterior cooling passage 64 in the anterior-side cooling passage group 63a.

In addition, the ventral wall thickness Wp at any position in the hub-side region Rh in the posterior-side cooling passage group 63b in the vane height direction Dwh decreases from the cooling passage 63 positioned closest to the side of the anterior edge 60a toward the posterior cooling passage 65 in the posterior-side cooling passage group 63b. That is, the ventral wall thickness Wp decreases in order of the third cooling passage 633, the fourth cooling passage 634, the fifth cooling passage 635, and the sixth cooling passage 536. Accordingly, the rigidity of the rotor blade body 60 at any position in the hub-side region Rh in the posterior-side cooling passage group 63b decreases from the cooling passage 63 positioned closest to the side of the anterior edge 60a toward the posterior cooling passage 65 in the posterior-side cooling passage group 63b.

In addition, in the first cooling passage 631, the ventral wall thickness Wp at any position in the hub-side region Rh is smaller than the ventral wall thickness Wp at any position in the tip-side region Rt. Accordingly, rigidity of the hub-side region Rh in the rotor blade body 60 on the ventral surface 61 side is lower than rigidity of the tip-side region Rt in the rotor blade body 60 on the ventral surface 61 side.

That is, the ventral surface 61 side of the rotor blade body 60 can relieve the restraint of thermal elongation of the platform. Therefore, it is possible to reduce the thermal stress generated in the vicinity of the connecting portion with the ventral surface 61 of the rotor blade body 60 in the platform 70, and thus, it is possible to improve durability of the rotor blade 50.

In addition, in each of the cooling passages 63 (first cooling passage 631 to sixth cooling passage 636), the dorsal wall thickness Wn at the tip-side position Pt is smallest and the dorsal wall thickness Wn at the hub-side position Ph is greatest among the dorsal wall thicknesses Wn for each of the plurality of positions in the vane height direction Dwh. Accordingly, at the hub-side position Ph in the rotor blade body 60, a centrifugal load applied to the rotor blade body 60 on the tip side Dwht from the hub-side position Ph can be supported.

In addition, the dorsal wall thickness Wn in each of the cooling passages 63 (first cooling passage 631 to sixth cooling passage 636) gradually increases from the tip-side position Pt toward the hub-side position Ph. Therefore, at each position in the rotor blade body 60, a centrifugal load applied to the rotor blade body 60 on the tip side Dwht from the position can be more supported.

Other Embodiments

The embodiment of the present disclosure has been described in detail above with reference to the drawings. However, a specific configuration is not limited to the configuration of the embodiment, and additions, omissions, and substitutions of components and other modifications can be made without departing from the scope of the present disclosure. Further, the present disclosure is not limited by the embodiment, and is limited only by the claims.

In the above-described embodiment, the first ventral wall thickness Wp1 in the first cooling passage 631 increases from the tip-side position Pt toward the middle position Pm, is at its maximum at the middle position Pm, and decreases from the middle position Pm toward the hub-side position Ph. However, the present disclosure is not limited to only the first cooling passage 631.

The ventral wall thickness Wp in all or at least one or more cooling passages 63 of the second cooling passage 632, the third cooling passage 633, the fourth cooling passage 634, the fifth cooling passage 635, and the sixth cooling passage 636 may increase from the tip-side position Pt toward the middle position Pm, may be at its maximum at the middle position Pm, and may decrease from the middle position Pm toward the hub-side position ph.

Therefore, in the cooling passage 63, the ventral/dorsal wall thickness ratio Rpn at any position in the hub-side region Rh is smaller than the ventral/dorsal wall thickness ratio Rpn at any position in the tip-side region Rt. In addition, an average ventral/dorsal wall thickness ratio Rpn in the hub-side region Rh is smaller than an average ventral/dorsal wall thickness ratio Ron in the tip-side region Rt. In addition, regardless of the positions, a ratio of a change amount of the ventral/dorsal wall thickness ratio Rpn to a change amount of the vane height direction Dwh in the hub-side region Rh is larger than a ratio of a change amount of the ventral/dorsal wall thickness ratio Rpn to a change amount of the vane height direction Dwh in the tip-side region Rt.

In addition, the ventral wall thickness Wp at the hob-side position Ph in one cooling passage 63 may be smallest among the ventral wall thicknesses Wp for each of the one or more cooling passages 63 and for each of the plurality of positions in the vane height direction Dwh.

In addition, in the embodiment, the first ventral wall thickness Wp1 is at its maximum at the middle position Pm. In other words, a position where the first ventral wall thickness Wp1 is at its maximum in the vane height direction Dwh is the middle position Pm. In the vane height direction Dwh, the position where the first ventral wall thickness Wp1 is at its maximum, that is, the middle position Pm, is not limited to a position of 30% of the vane height from the platform 70 as in the present embodiment, and may be a position of 25% to 35% of the vane height from the platform 70.

[Supplementary Notes]

The rotor blade and the gas turbine including the rotor blade according to the above-described embodiment are understood as follows, for example.

(1) A rotor blade 50 in a first aspect includes a rotor blade body 60 having an airfoil-shaped cross section and extending in a vane height direction Dwh having a directional component perpendicular to the cross section, and a platform 70 provided t, among a tip side Dwht and a hub side Dwhs opposite to the tip side Dwht in the vane height direction Dwh, an end of the rotor blade body 50 on the hub side Dwhs, in which the rotor blade body 60 has an anterior edge 60a and a posterior edge 60b extending in the vane height direction Dwh and facing sides that are opposite to each other, a ventral surface 61 and a dorsal surface 62 extending in the vane height direction Dwh, connecting the anterior edge 60a and the posterior edge 60b to each other, and facing sides that are opposite to each other, and one or more cooling passages 63 positioned between the ventral surface 61 and the dorsal surface 62 and extending in the vane height direction Dwh, a distance between an inner peripheral surface in the one or cooling passages 63 and the dorsal surface 62 is a dorsal wall thickness Wn, a distance between the inner peripheral surface in the one or more cooling passages 63 and the ventral surface 61 is a ventral wall thickness Wp, a ratio of the ventral wall thickness Wp to the dorsal wall thickness Wn is a ventral/dorsal wall thickness ratio Rpn, a position of 5% to 15% of a vane height, which is a distance from the platform 70 to an end of the rotor blade body 60 on the tip side Dwht, is a hub-side position Ph, a position of 25% to 35% of the vane height from the platform 70 is a middle position Pm, a position of 90% to 100% of the vane height from the platform 70 is a tip-side position Pt, and the ventral/dorsal wall thickness ratio Rpn at any position in a hub-side region Rh between the hub-side position Ph and the middle position Pm in the vane height direction Dwh smaller than is the ventral/dorsal wall thickness ratio Rpn at any position in a tip-side region Rt between the middle position Pm and the tip-side position Pt in the vane height direction Dwh, in any one cooling passage 63 of the one or more cooling passages 63.

Accordingly, rigidity of the rotor blade body 60 on a ventral surface 61 side can be reduced to be lower than rigidity on a dorsal surface 62 side. Therefore, the ventral surface 61 side of the rotor blade body 60 can suppress the restraint of the platform more than the dorsal surface 62 side.

(2) A rotor blade 50 in a second aspect is the rotor blade 50 of (1), in which an average ventral/dorsal wall thickness ratio Rpn in the hub-side region Rh may be smaller than an average ventral/dorsal wall thickness ratio Rpn in the tip-side region Rt.

Accordingly, the rigidity of the rotor blade body 60 on the ventral surface 61 side can be reduced in a well-balanced manner.

(3) A rotor blade 50 in a third aspect is the rotor blade 50 of (1) or (2), in which a ratio of a change amount of the ventral/dorsal wall thickness ratio Rpn to a change amount of the vane height direction Dwh in the hub-side region Rh may be larger than a ratio of a change amount of the ventral/dorsal wall thickness ratio Rpn to a change amount of the vane height direction Dwh in the tip-side region Rt.

(4) A rotor blade 50 in a fourth aspect is the rotor blade 50 of any one of (1) to (3), in which the one or more cooling passages 63 may have four or more cooling passages 63 arranged in a camber line direction Dlc in which a camber line Ica of the rotor blade body 60 extends, and at least an anterior cooling passage 64 positioned closest to a side of the anterior edge 60a among the four or more cooling passages 63 may be the one cooling passage 63.

Accordingly, it is possible to reduce thermal stress generated in the vicinity of a connecting portion between the ventral surface 61 side and an anterior edge 60a side of the rotor blade body 60 in the platform 70.

(5) A rotor blade 50 in a fifth aspect is the rotor blade 50 of (4), in which the ventral wall thickness Wp at the middle position Pm in the anterior cooling passage 64 may be greater than the ventral wall thickness Wp at any position among the ventral wall thicknesses Wp with respect to the anterior cooling passage 64, except for the middle position Pm in the vane height direction Dwh at which the ventral wall thickness Wp is greatest.

(6) A rotor blade 50 in a sixth aspect is the rotor blade 50 of (4) or (5), in which the rotor blade 50 may include a portion that includes a part of the hub-side region Rh in the one cooling passage 63 and where the ventral/dorsal wall thickness ratio Ron is less than 80%.

(7) A rotor blade 50 in a seventh aspect is the rotor blade 50 of any one of (4) to (6), in which the anterior cooling passage 64 and one or more cooling passages 63 connected to the anterior cooling passage 64 among the four or more cooling passages 63 may form an anterior-side cooling passage group 63a, a posterior cooling passage 65 positioned closest to a side of the posterior edge 60b and one or more cooling passages 63 connected to the posterior cooling passage 65 among the four or more cooling passages 63 may form a posterior-side cooling passage group 63b, and a portion of 100% or more of the ventral/dorsal wall thickness ratio Rpn for each of a plurality of the cooling passages 63 included in the anterior-side cooling passage group 63a and for each of a plurality of positions in the vane height direction Dwh may be larger than a portion of 100% or more of the ventral/dorsal wall thickness ratio Rpn for each of the one or more cooling passages 63 included in the posterior-side cooling passage group 63b and for each of the plurality of positions in the vane height direction Dwh.

Accordingly, the rigidity of the rotor blade body 60 on the anterior edge 60a side can be increased as compared with rigidity of the posterior-side cooling passage group 63b.

(8) A rotor blade 50 in an eighth aspect is the rotor blade 50 of any one of (4) to (6), in which the anterior cooling passage 64 and one or more cooling passages 63 connected to the anterior cooling passage 64 among the four or more cooling passages 63 may form an anterior-side cooling passage group 63a, and the ventral wall thickness Wp at any position in the hub-side region Rh in the anterior-side cooling passage group 63a in the vane height direction Dwh may be reduced toward the anterior cooling passage 64.

Accordingly, the rigidity of the rotor blade body 60 at any position in the hub-side region Rh in the anterior-side cooling passage group 63a in the vane height direction Dwh decreases from the cooling passage 63 positioned closest to the side of the posterior edge 60b toward the anterior cooling passage 64 in the anterior-side cooling passage group 63B.

(9) A rotor blade 50 in a ninth aspect is the rotor blade 50 of (8), in which a posterior cooling passage 65 positioned closest to the side of the posterior edge 60b and one or more cooling passages 63 connected to the posterior cooling passage 65 among the four or more cooling passages 63 may form a posterior-side cooling passage group 63b, and the ventral wall thickness Wp at any position in the hub-side region Rh in the posterior-side cooling passage group in the vane height direction Dwh may be reduced toward the posterior cooling passage 65.

Accordingly, the rigidity of the rotor blade body 60 at any position in the hub-side region Rh in the posterior-side cooling passage group 63b in the vane height direction Dwh decreases from the cooling passage 63 positioned closest to the side of the anterior edge 60a toward the posterior cooling passage 65 in the posterior-side cooling passage group 63b.

(10) A rotor blade 50 in a tenth aspect includes a rotor blade body 60 having an airfoil-shaped cross section and extending in a vane height direction Dwh having a directional component perpendicular to the cross section, and a platform 70 provided at, among a tip side Dwht and a hub side Dwhs opposite to the tip side Dwht in the vane height direction Dwh, an end of the rotor blade body 60 on the hub side Dwhs, in which the rotor blade body 60 has an anterior edge 60a and a posterior edge 60b extending in the vane height direction Dwh and facing sides that are opposite to each other, a ventral surface 61 and a dorsal surface 62 extending in the vane height direction Dwh, connecting the anterior edge 60a and the posterior edge 60b to each other, and facing sides that are opposite to each other, and one or more cooling passages 63 positioned between the ventral surface 61 and the dorsal surface 62 and extending in the vane height direction Dwh, a distance between an inner peripheral surface in the one or more cooling passages 63 and e dorsal surface 62 is a dorsal wall thickness Wn, a distance between the inner peripheral surface in the one or more cooling passages 63 and the ventral surface 61 is a ventral wall thickness Wp, a position of 5% to 15% of a vane height, which is a distance from the platform 70 to an end of the rotor blade body 60 on the tip side Dwht, is a hub-side position Ph, a position of 25% to 35% of the vane from the platform 70 is a middle position Pm, a position of 90% to 100% of the vane height from the platform 70 is a tip-side position Pt, and the ventral wall thickness Wp at any position in a hub-side region Rh between the hub-side position Ph and the middle position Pm in the vane height direction Dwh is smaller than the ventral wall thickness Wp at any position in a tip-side region Rt between the middle position Pm and the tip-side position Pt in the vane height direction Dwh, in any one cooling passage 63 of the one or more cooling passages 63.

Accordingly, the rigidity of the hub-side region Rh in the rotor blade body 60 on the ventral surface 61 side is lower than the rigidity of the tip-side region Rt in the rotor blade body 60 on the ventral surface 61 side. Therefore, the restriction of thermal elongation of the platform 70 by means of the rotor blade body 60 on the ventral surface 61 side can be relaxed.

A rotor blade 50 in an eleventh aspect is the rotor blade 50 of any one of (1) to (10), in which the dorsal wall thickness Wn at the tip-side position Pt may be smallest and the dorsal wall thickness Wn at the hub-side position Ph may be greatest among the dorsal wall thicknesses Wn for each of a plurality of positions in the vane height direction Dwh, in the one cooling passage 63.

Accordingly, at the hub-side position Ph in the rotor blade body 60, a centrifugal load applied to the rotor blade body 60 on the tip side Dwht from the hub-side position Ph can be supported.

(12) A rotor blade 50 in a twelfth aspect is the rotor blade 50 of (11), in which the dorsal wall thickness Wn in the one cooling passage 63 may gradually increase from the tip-side position Pt toward the hub-side position Ph.

Accordingly at each position in the rotor blade body 60, a centrifugal load applied to the rotor blade body 60 on the tip side Dwht from the position can be more supported.

(13) A gas turbine 100 in a thirteenth aspect includes a plurality of the rotor blades 50 of any one of (1) to (12), a rotor shaft 41 that is rotatable around an axis Ar and that is provided with the plurality of rotor blades 50 on an outer periphery, and a gas turbine casing 101 that covers the plurality of rotor blades 50 and the rotor shaft 41.

INDUSTRIAL APPLICABILITY

According to the present disclosure, it is possible to improve durability of a rotor blade.

REFERENCE SIGNS LIST

1: compressor
2: middle casing
3: combustor
4: turbine
10: compressor rotor
11: compressor rotor shaft
12: compressor rotor blade row
20: compressor casing
21: compressor casing main body
22: compressor stator vane row
23: air inlet portion
40: turbine rotor
41: rotor shaft
42: rotor blade row
43: turbine casing
44: turbine casing main body
45: stator vane row
50: rotor blade
51: rotor blade cooling passage
60: rotor blade body
60a: anterior edge
60b: posterior edge
61: ventral surface
62: dorsal surface
63: cooling passage
63a: anterior-side cooling passage group
63b: posterior-side cooling passage group
64: anterior cooling passage
65: posterior cooling passage
70: platform
71: gas path surface
75: platform cooling passage
80: fillet portion
90: shaft attachment portion
91: shank
92: vane root
93: shaft attachment portion cooling passage
93a: fluid inlet
100: gas turbine
101: gas turbine casing
102: gas turbine rotor
200: generator 201: output shaft
631: first cooling passage
632: second cooling passage
633: third cooling passage
634: fourth cooling passage
635: fifth cooling passage
636: sixth cooling passage
A1: air
A2: compressed air
A3: cooling fluid
Ar: axis
Cg: combustion gas passage
Da: axial direction
Dad: axial downstream side
Dau: axial upstream side
Dc: circumferential direction
Dr: radial direction
Dri: radial inner side
Dro: radial outer side
Dlc: camber line direction
Dwh: vane height direction
Dwhs: hub side
Dwht: tip side
F: fuel
G: combustion gas
Lca: camber line
P0: reference position
P1: first position
P2: second position
P3: third position
P4: fourth position
P5: fifth position
P6: sixth position
P7: seventh position
P8: eighth position
P9: ninth position
P10: tenth position
P11: eleventh position
P12: twelfth position
P13: thirteenth position
P14: fourteenth position
P15: fifteenth position
P16: sixteenth position
P17: seventeenth position
P18: eighteenth position
P19: nineteenth position
P20: tip position
Ph: hub-side position
Pm: middle position
Pt: tip-side position
Rh: hub-side region
Rpn: ventral/dorsal wall thickness ratio
Rpn1: first ventral/dorsal wall thickness ratio
Rpn2: second ventral/dorsal wall thickness ratio
Rpn3: third ventral/dorsal wall thickness ratio
Rpn4: fourth ventral/dorsal wall thickness ratio
Rpn5: fifth ventral/dorsal wall thickness ratio
Rpn6: sixth ventral/dorsal wall thickness ratio
Rt: tip-side region
Tip: tip-side tip
Wn: dorsal wall thickness
Wn1: first dorsal wall thickness
Wn2: second dorsal wall thickness
Wn3: third dorsal wall thickness
Wn4: fourth dorsal wall thickness
Wn5: fifth dorsal wall thickness
Wn6: sixth dorsal wall thickness
Wp: ventral wall thickness
Wp1: first ventral wall thickness
Wp2: second ventral wall thickness
Wp3: third ventral wall thickness
Wp4: fourth ventral wall thickness
Wp5: fifth ventral wall thickness
Wp6: sixth ventral wall thickness

The invention claimed is:

1. A rotor blade comprising:
a rotor blade body having an airfoil-shaped cross section and extending in a vane height direction having a directional component perpendicular to the cross section; and
a platform provided at, among a tip side and a hub side opposite to the tip side in the vane height direction, an end of the rotor blade body on the hub side,
wherein the rotor blade body has
an anterior edge and a posterior edge extending in the vane height direction and facing sides that are opposite to each other,
a ventral surface and a dorsal surface extending in the vane height direction, connecting the anterior edge and the posterior edge to each other, and facing sides that are opposite to each other, and
one or more cooling passages positioned between the ventral surface and the dorsal surface and extending in the vane height direction,
a distance between an inner peripheral surface in the one or more cooling passages and the dorsal surface is a dorsal wall thickness,
a distance between the inner peripheral surface in the one or more cooling passages and the ventral surface is a ventral wall thickness,
a ratio of the ventral wall thickness to the dorsal wall thickness is a ventral/dorsal wall thickness ratio,
a position of 5% to 15% of a vane height, which is a distance from the platform to an end of the rotor blade body on the tip side, is a hub-side position,
a position of 25% to 35% of the vane height from the platform is a middle position,
a position of 90% to 100% of the vane height from the platform is a tip-side position, and
the ventral/dorsal wall thickness ratio at any position in a hub-side region between the hub-side position and the middle position in the vane height direction is smaller than the ventral/dorsal wall thickness ratio at any position in a tip-side region between the middle position and the tip-side position in the vane height direction, in any one cooling passage of the one or more cooling passages.

2. The rotor blade according to claim 1,
wherein an average ventral/dorsal wall thickness ratio in the hub-side region is smaller than an average ventral/dorsal wall thickness ratio in the tip-side region.

3. The rotor blade according to claim 1,
wherein a ratio of a change amount of the ventral/dorsal wall thickness ratio to a change amount of the vane height direction in the hub-side region is larger than a ratio of a change amount of the ventral/dorsal wall thickness ratio to a change amount of the vane height direction in the tip-side region.

4. The rotor blade according to claim 1,
wherein the one or more cooling passages have four or more cooling passages arranged in a camber line direction in which a camber line of the rotor blade body extends, and at least an anterior cooling passage positioned closest to a side of the anterior edge among the four or more cooling passages is the one cooling passage.

5. The rotor blade according to claim 4,
wherein the ventral wall thickness at the middle position in the anterior cooling passage is greater than the ventral wall thickness at any position among the ventral wall thicknesses with respect to the anterior cooling passage, except for the middle position in the vane height direction at which the ventral wall thickness is greatest.

6. The rotor blade according to claim 4, wherein the rotor blade includes a portion that includes a part of the hub-side region in the one cooling passage and where the ventral/dorsal wall thickness ratio is less than 80%.

7. The rotor blade according to claim 4,
wherein the anterior cooling passage and one or more cooling passages connected to the anterior cooling passage among the four or more cooling passages form an anterior-side cooling passage group,
a posterior cooling passage positioned closest to a side of the posterior edge and one or more cooling passages connected to the posterior cooling passage among the four or more cooling passages form a posterior-side cooling passage group, and
a portion of 100% or more of the ventral/dorsal wall thickness ratio for each of a plurality of the cooling passages included in the anterior-side cooling passage group and for each of a plurality of positions in the vane height direction is larger than a portion of 100% or more of the ventral/dorsal wall thickness ratio for each of the one or more cooling passages included in the posterior-side cooling passage group and for each of the plurality of positions in the vane height direction.

8. The rotor blade according to claim 4,
wherein the anterior cooling passage and one or more cooling passages connected to the anterior cooling passage among the four or more cooling passages form an anterior-side cooling passage group, and
the ventral wall thickness at any position in the hub-side region in the anterior-side cooling passage group in the vane height direction is reduced from the cooling passage positioned closest to a side of the posterior edge toward the anterior cooling passage in the anterior-side cooling passage group.

9. The rotor blade according to claim 8,
wherein a posterior cooling passage positioned closest to the side of the posterior edge and one or more cooling passages connected to the posterior cooling passage among the four or more cooling passages form a posterior-side cooling passage group, and
the ventral wall thickness at any position in the hub-side region in the posterior-side cooling passage group in the vane height direction is reduced from the cooling passage positioned closest to the side of the anterior edge toward the posterior cooling passage in the posterior-side cooling passage group.

10. The rotor blade according to claim 1,
wherein the dorsal wall thickness at the tip-side position is smallest and the dorsal wall thickness at the hub-side position is greatest among the dorsal wall thicknesses for each of a plurality of positions in the vane height direction, in the one cooling passage.

11. The rotor blade according to claim 10,
wherein the dorsal wall thickness in the one cooling passage gradually increases from the tip-side position toward the hub-side position.

12. A gas turbine comprising:
a plurality of the rotor blades according to claim 1;
a rotor shaft that is rotatable around an axis and that is provided with the plurality of rotor blades on an outer periphery; and
a gas turbine casing that covers the plurality of rotor blades and the rotor shaft.

13. A rotor blade comprising:
a rotor blade body having an airfoil-shaped cross section and extending in a vane height direction having a directional component perpendicular to the cross section; and
a platform provided at, among a tip side and a hub side opposite to the tip side in the vane height direction, an end of the rotor blade body on the hub side,
wherein the rotor blade body has
an anterior edge and a posterior edge extending in the vane height direction and facing sides that are opposite to each other,
a ventral surface and a dorsal surface extending in the vane height direction, connecting the anterior edge and the posterior edge to each other, and facing sides that are opposite to each other, and
one or more cooling passages positioned between the ventral surface and the dorsal surface and extending in the vane height direction,
a distance between an inner peripheral surface in the one or more cooling passages and the dorsal surface is a dorsal wall thickness,
a distance between the inner peripheral surface in the one or more cooling passages and the ventral surface is a ventral wall thickness,
a position of 5% to 15% of a vane height, which is a distance from the platform to an end of the rotor blade body on the tip side, is a hub-side position,
a position of 25% to 35% of the vane height from the platform is a middle position,
a position of 90% to 100% of the vane height from the platform is a tip-side position, and
the ventral wall thickness at any position in a hub-side region between the hub-side position and the middle position in the vane height direction is smaller than the ventral wall thickness at any position in a tip-side region between the middle position and the tip-side position in the vane height direction, in any one cooling passage of the one or more cooling passages.

* * * * *